United States Patent [19]

Leichliter et al.

[11] 3,968,866

[45] July 13, 1976

[54] FLUID COUPLING

[75] Inventors: Wayne K. Leichliter; Rodney H. Detty; John B. Hill, all of Marshall, Mich.

[73] Assignee: Eaton Corporation, Cleveland, Ohio

[22] Filed: Nov. 29, 1974

[21] Appl. No.: 528,542

[52] U.S. Cl. .......................... 192/58 B; 192/82 T; 192/113 A
[51] Int. Cl.² ................. F16D 35/00; F16D 43/25; F16D 13/72
[58] Field of Search ............ 192/58 B, 82 T, 113 A; 277/25

[56] References Cited
UNITED STATES PATENTS

| | | | |
|---|---|---|---|
| 3,144,922 | 8/1964 | Weir | 192/58 B |
| 3,256,027 | 6/1966 | Chapel | 277/25 |
| 3,262,528 | 7/1966 | Weir | 192/58 B |
| 3,268,041 | 8/1966 | Roper | 192/58 B |
| 3,404,832 | 10/1968 | Sutaruk | 192/58 B X |
| 3,463,282 | 8/1969 | Fujita et al. | 192/58 B |
| 3,512,622 | 5/1970 | Sutaruk | 192/58 B |
| 3,648,811 | 3/1972 | LaFlame | 192/82 T X |
| 3,809,197 | 5/1974 | Clancey | 192/58 B |
| 3,856,122 | 12/1974 | Leichliter | 192/82 T X |

*Primary Examiner*—Allan D. Herrmann
*Attorney, Agent, or Firm*—Teagno & Toddy

[57] ABSTRACT

A fluid coupling for driving a cooling fan associated with a vehicle in a ram air stream. The coupling comprises relatively rotatable input and output members. The output member defines a chamber within which the input member rotates. The members have lands and grooves which define a shear space therebetween, and are cooperable with viscous shear fluid to transmit torque therebetween. The output member defines a reservoir chamber located forwardly of the lands and grooves in the ram air stream. An impact pumping ramp on the output member directs fluid from the shear space into the reservoir chamber during rotation of the input member. A temperature-responsive valve arrangement controls the flow of fluid from the reservoir chamber to the shear space. The output member has mounting pads against which fan blades are secured. The mounting pads are located axially on the output member between the lands and grooves, and the reservoir chamber and at least, in part, radially outwardly in the lands and grooves. This mounting results in an air cooling chamber being located axially adjacent the land and groove area and radially outwardly of the reservoir chamber. The output coupling member on the backside thereof has a unique construction which minimizes the overall axial length of the unit.

15 Claims, 5 Drawing Figures

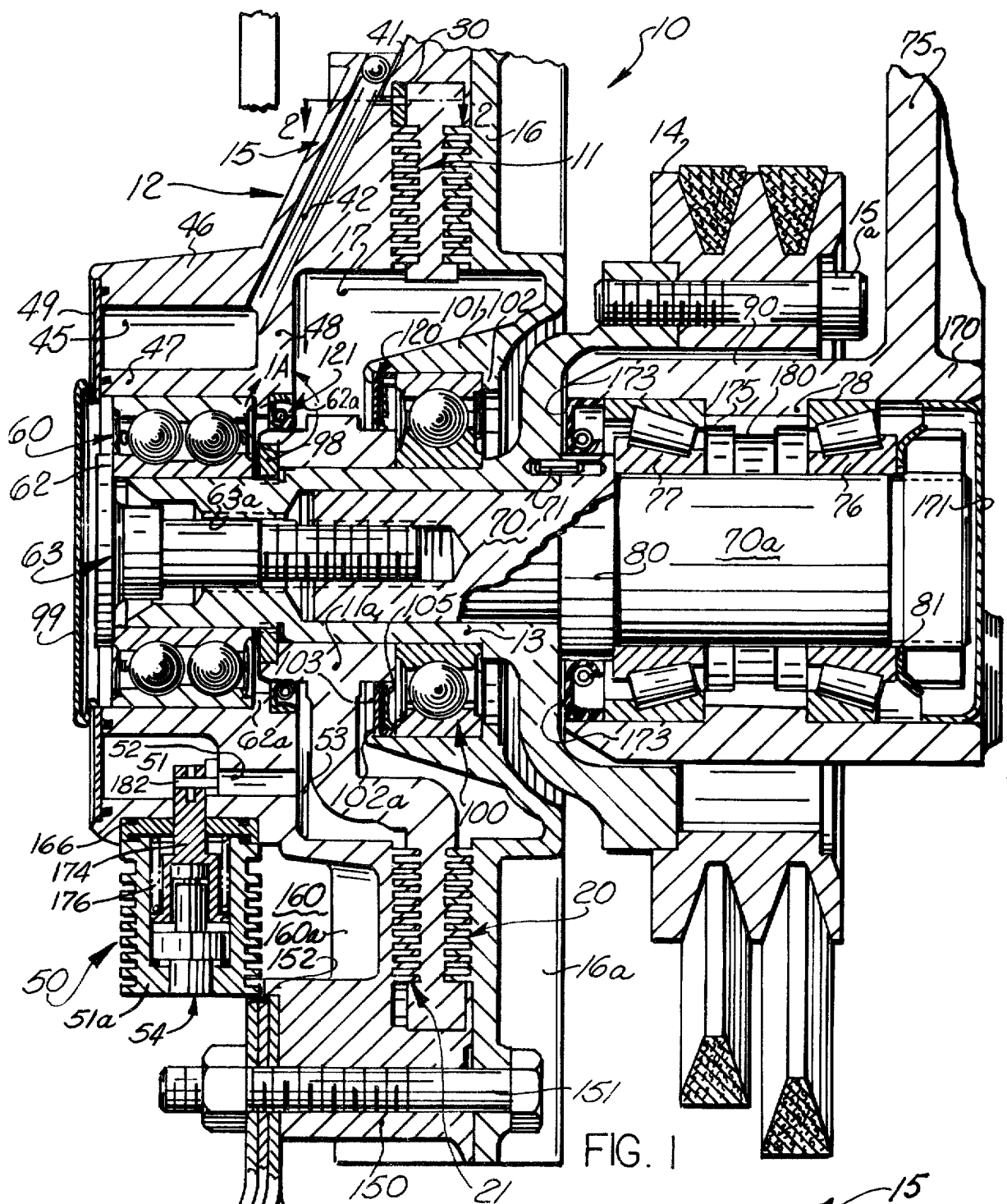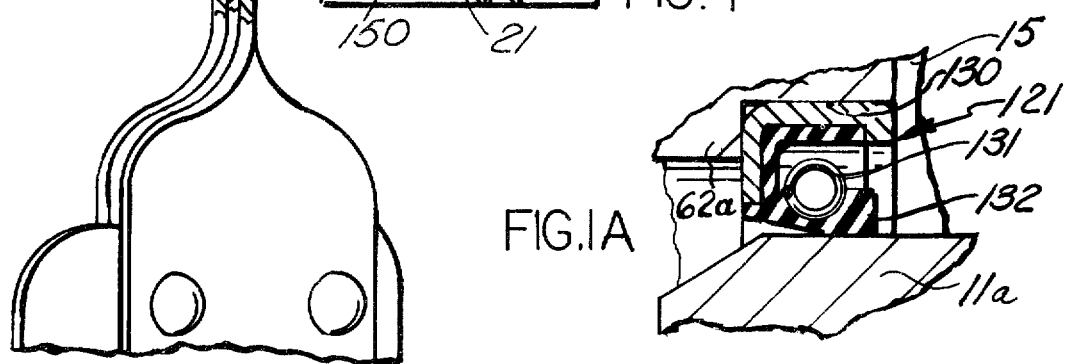

FLUID COUPLING

BACKGROUND OF THE PRESENT INVENTION

The present invention relates to fluid couplings, and specifically fluid couplings for driving a cooling fan device associated with a vehicle.

Fluid couplings for driving a cooling fan device associated with a vehicle are well known. Such known fluid couplings include an output member on which the fan blades are secured and which output member defines a chamber in which the input member of the fluid coupling is mounted. The input and output members of the fluid coupling conventionally include lands and grooves which define a shear space therebetween and a fluid shear medium located in the shear space transmits torque from the input coupling member to the output coupling member. The advantages of such fluid couplings in driving fan cooling devices in vehicles are well known.

The torque transmitted from the input member to the output member is controlled by the amount of viscous fluid in the shear space accordingly; such fluid coupling devices have been constructed in order to provide for removal of fluid from the shear space as well as provision for directing fluid into the shear space in order to control torque transmission. Commonly, such devices include a fluid reservoir chamber and pumping elements which pump fluid from the shear space into the reservoir chamber, and a temperature-responsive valve for controlling the flow of fluid from the reservoir chamber back into the shear space. Such structure operates in order to remove fluid from the shear space when cooling action is not necessary by the fan and provides for directing fluid into the shear space when cooling action by the fan is desired.

SUMMARY OF THE PRESENT INVENTION

The present invention is directed to a new and an improved heavy duty viscous fluid coupling primarily for use in driving the cooling fan device of a truck. The viscous coupling of the present invention includes all of the features noted above with respect to the known prior art, and in addition is a practical construction, providing for efficient dissipation of heat thereby resulting in efficient operation. The device is constructed in order to have a substantially long life with minimum of maintenance problems, and in addition is constructed to operate with a minimum amount of noise. Further, the unit of the present invention has an extremely effective package size, particularly in view of the heavy duty application of the unit.

More specifically, the viscous coupling of the present invention includes a reservoir chamber which is located forwardly of the unit, directly in the ram air stream. The reservoir chamber is located forwardly of the land-groove area. The fan blade mounting pads are located axially intermediate the reservoir chamber and the lands and grooves. In addition, the fan blade mounting pads are located radially outwardly of the lands and grooves. As a result, the output member of the viscous coupling is provided with, in effect, a chamber located radially outwardly of the reservoir chamber and axially forwardly of the lands and grooves, and in which chamber cooling fins are located in order to provide for effective dissipation of heat which is generated in the land and groove area.

Further in accordance with the present invention, a seal is provided between the input coupling member and the output coupling member. The seal is structured so that at high speeds of rotation the force of the seal engagement is reduced thereby reducing any wear on the seal at high speeds between the input and output coupling member. Of course, sealing action at high speeds of the input and output coupling member is not necessary due to the fact that the viscous shear fluid is located radially outwardly of the seal in the land and groove areas. However, this construction does provide for a longer-life for the seal.

Further, the viscous coupling of the present invention includes a unique pumping arrangement for directing fluid from a shear space into the reservoir chamber. The unique arrangement herein provides for a ramp member against which the fluid is impacted and, in addition, a wiper which is constructed to cooperate with the ramp to provide for efficient and effective pumping action for removal of fluid from the viscous shear space.

Description of the Figures

Further features of the present invention will be apparent to those skilled in the art to which it relates from the following detailed description of a preferred embodiment of the present invention made with reference to the accompanying drawings in which:

FIG. 1 is an axial section view of a viscous coupling embodying the present invention;

FIG. 1A is a fragmentary view of a portion of the coupling of FIG. 1.

Description of the Preferred Embodiment

Figure 2:
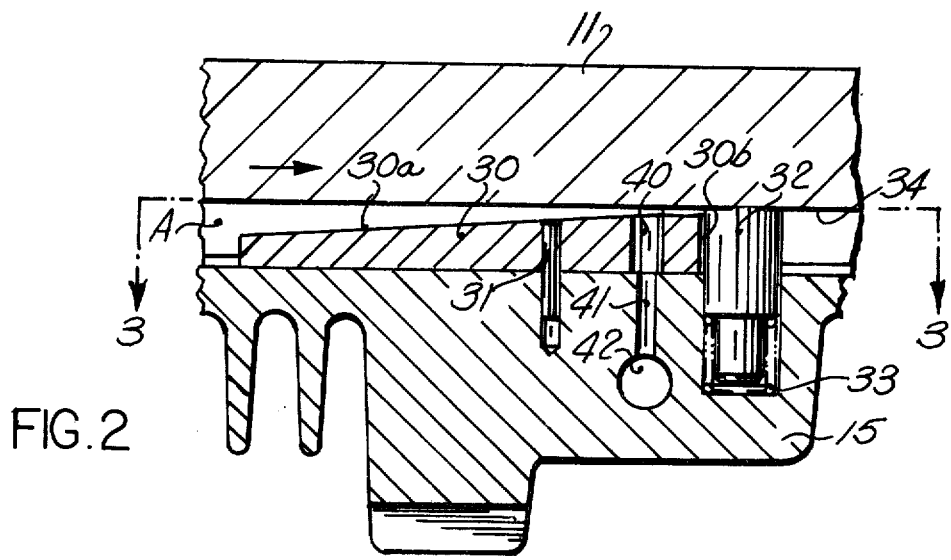
FIG. 2 is a fragmentary sectional view of the viscous coupling of FIG. 1, taken approximately along the line 2—2 thereof.

The present invention is preferably embodied in a viscous coupling of a heavy duty construction for purposes of driving the fan cooling device of a truck. The viscous coupling of the present invention, however, may be utilized in a variety of different environments for a variety of purposes, as is known. The viscous coupling of the present invention is constructed so as to produce minimum noise during operation have a low cost to manufacture, have a long life, and require a minimum of maintenance.

As viewed in FIG. 1, the viscous coupling of the present invention is preferably embodied in a viscous coupling 10 having an input member 11 and an output member 12. The input member 11 is a clutch disc member which is pressed to a hollow shaft portion 13 of a pulley mounting member to which a pulley 14 is suitably fastened by screws 15a. The pulley 14 is suitably driven from the engine of the vehicle by a suitable belt. It should be clear, however, upon rotation of the pulley 14, the input coupling member 11 likewise rotates. The input coupling member 11 has a spoke-type of construction, enabling fluid to flow between the opposite sides thereof.

The output coupling member 12 is made of two parts 15 and 16 which define a chamber 17 in which the input coupling member 11 is located. The parts 15, 16 are suitably secured together by a plurality of fasteners

3 which extend through the outer periphery of the parts. The input coupling member 11 and the output coupling member 12 have a plurality of lands and grooves formed thereon which are designated 20, 21. The lands and grooves 20 are located on the rear side of the coupling device, whereas the lands and grooves 21 are located on the forward side of the coupling device. This provides for effective heavy duty transmission of torque due to the large number of lands and grooves provided.

As is known, the lands and grooves 20, 21 define therebetween a viscous shear space and a viscous shear fluid located in that shear space provides for transmission of torque between the input member and the output member. Thus, upon rotation of the input coupling member 11, the output coupling member 12 will be rotated by the viscous shear in the shear space defined between the lands and grooves 20, 21.

Figure 3:
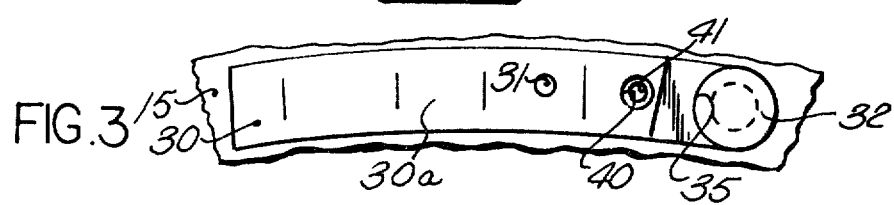
FIG. 3 is a view taken approximately along the line 3—3 of FIG. 2.

The viscous coupling 10 is constructed so that the volume of fluid in the land and groove areas 20, 21 can be varied. The fluid in the viscous shear space defined by the lands and grooves is pumped therefrom by the action of a ramp-type part 30 in cooperation with a spring-biased wiper 32, as best shown in FIG. 2. As shown in FIG. 2, the part 30 is wedge shaped and is suitably secured by a pin 31 to the output coupling member 15. As the input coupling member 11 rotates relative to the output coupling member 15, the input coupling member drags fluid in the shear space, designated A in FIG. 2, and forces that fluid against the inclined surface 30a of the part 30. In addition, the fluid is impacted against the pumping element or wiper 32 which is biased by a spring 33 into engagement with a radial surface 34 on the input member 11. As best shown in FIG. 3, the pumping element 32 is a circular element and fits into a recess 35 formed on the edge 30b of the element 30. As a result of this construction, fluid which is dragged around by the input member 11 is forced into the space defined between the surface 34 of the input member 11 and the surface 30a of the part 30 and as a result the pressure of the fluid therein increases, particularly in the area immediately adjacent the pumping element 32.

In the area immediately adjacent the pumping element 32 is an opening 40 formed in the part 30 and that opening 40 communicates with a radially extending passage 41 and a generally axially extending passage 42 in the member 15.

As a result of this construction which provides for increased fluid pressure against opening 40 fluid flows from the shear space A through the opening 40, a passageway 41, and passageway 42 into a reservoir chamber, generally designated 45 in FIG. 1. The fluid flows from the shear space defined by the lands and grooves 21, as well as from the shear space defined by the lands and grooves 20, due to fluid communication between those shear spaces provided by a plurality of passages in the input member 11 and extending between the opposite sides thereof. A plurality of impact pumping means may be utilized in order to effect the removal of fluid from the land and groove areas; however, only one is shown in the drawings.

The reservoir chamber 45 is located axially of the land and groove areas 20, 21 and projects into the ram air stream. The reservoir chamber 45 is defined by axially extending portions 46, 47 of the input member 15 and which portions are concentric about the axis of the input member 15. At one end the reservoir chamber 45 is closed by a web portion 48 of the member 15, and at the axially forward end the reservoir chamber 45 is closed by a suitable cover 49 which is secured to the protions 46, 47 by suitable turned-over portions thereof. Suitable seals are provided to effect a fluid tight closure of the reservoir chamber 45.

Fluid may flow from the reservoir chamber 45 into the shear spaces defined by the lands and grooves 20, 21 under the control of a temperature-responsive valve device, generally designated 50. The temperature-responsive valve device 50 includes a housing 51a which is mounted in the ram air stream radially outwardly of the reservoir chamber 45. The specific structure of this temperature-responsive valving device does not form a part of this invention and is described in copending application Ser. No. 528,187 filed on Nov. 29, 1974.

However, for purposes of fully understanding the operation of the fluid coupling 10 it should be understood that the temperature-responsive valve device 50 includes a valve member 51 which covers an opening or passage 52 which extends from the reservoir chamber 45 into an area 53 in the chamber 17. Fluid flows from the reservoir chamber 45 through the passage 52 and into the area 53 of the chamber 17 when the valve member 51 is in an open position. Once the fluid is in the chamber 17, it is thrown radially outwardly into the area defined between the lands and grooves 20, 21. Thus the valve device 50 does control the flow of fluid into the shear space defined by the lands and grooves 20, 21.

Figure 4:
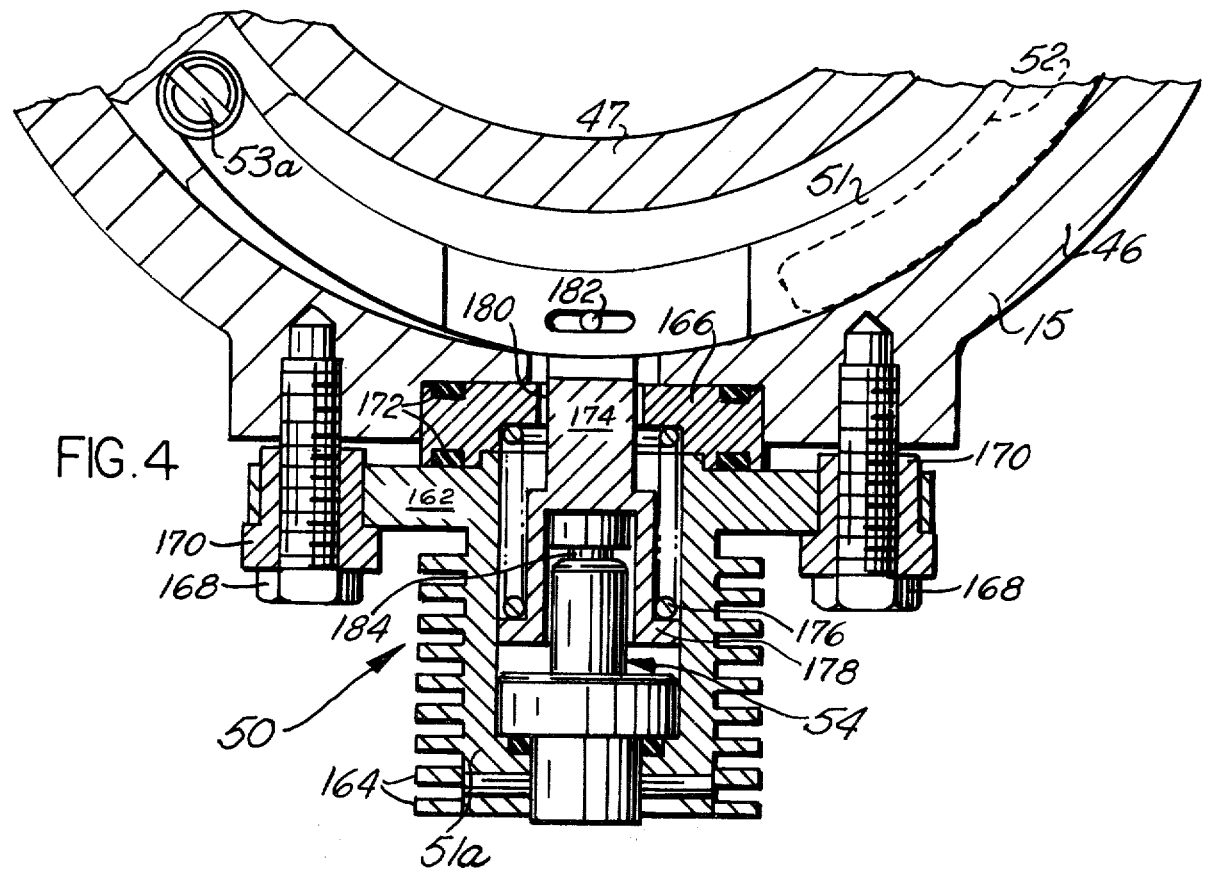
FIG. 4 is a further fragmentary view of the viscous coupling shown in FIG. 1.

The valve member 51 is in the form of an arcuate plate and is moved about a pivot 53a in response to changes in temperature as sensed by a suitable temperature-sensing wax filled power element arrangement 54. The temperature-sensing pill 54 is suitably mechanically connected to the valve member 51 so that the valve member 51 has a closed position, as shown in FIG. 4, when the temperature is low, and thus fluid cannot flow from the reservoir chamber 45 into the shear space. However, if the temperature increases, the temperature-sensing device 54 will effect action on the valve member 51 to effect movement of the valve member so as to provide for flow of fluid into the passage 52 and thus into the shear space defined by lands and grooves 20, 21.

From the above it should be clear that a viscous fluid coupling has been provided in which the input member 11 is rotated from the pulley 14 and the output member 12 will be driven in dependence upon the amount of fluid in the areas between the lands and grooves 20, 21. The amount of fluid in the areas between the lands and grooves 20, 21 is under the control of the action of the ramp member 30 and wiper 32 which cooperate to provide effective pumping of fluid from the shear spaces into the reservoir chamber 45 and likewise is under the control of the temperature-sensing valve unit 50 which controls the flow of fluid from the reservoir chamber 45 back into the shear space 20, 21.

From the above, it should be clear that the output coupling member rotates relative to the input coupling member and the output coupling member 12 has been structured in order to be effectively mounted for rotation relative thereto, In this connection, a bearing 60 is located between the portion 47 of the member 15 and the hollow shaft portion 13 of the pulley mounting. Bearing 60 is a double bearing and supports the forwardmost axial end of the output coupling member 12 and lies in a radial plane which plane also includes the reservoir chamber 45. The bearing 60 is pressed into portion 47 and on its inner axial end engages a shoulder 62a on the output coupling member 15. Clearance exists between the outer end of the bearing 60 and a flange portion 62 of a threaded fastener 63. The threaded fastener 63 passes through a threaded bore 63a of the member 13 and is threaded into a threaded bore of a jackshaft portion 70. The threaded fastener 63 shoulders against shaft 13 and maintains the parts in tight axial secured engagement and prevents the coupling 10 from moving leftwardly relative to a jackshaft housing 75, which is suitably bolted to the engine block.

The jackshaft portion 70 into which the fastener 63 is threaded comprises a part of a jackshaft 70a and the shaft 70a is driven at least in part by a pin connection 71 with the member 13. The pin 71 projects from an opening in the member 13 and into an aligned opening in the shaft member 70a. As a result, the pin 71 ensures 1:1 rotation of the shaft 70a with the member 13. Preferably, a plurality of pins like 71 are used, only one being shown in the drawings.

The shaft 70a is supported for rotation relative to the jackshaft housing 75 by bearings 76, 77. The bearings 76, 77 are tapered roller bearings and are apaced apart by a suitable shoulder portion 78 of the housing 75. The bearing 77 on its left side engages a flange part 80 of the shaft 70a so as to prevent movement of the bearing toward the left. The bearing 76 on its right end engages a locknut and lock washer 81 which prevent that bearing from moving toward the right. As a result of this construction, which includes the shoulder portion 78, the bearings are held against axial sliding movement. The bearings 76, 77 are supported between the shaft 70a and a hub or projecting portion 90 of the jackshaft housing 75. The portion 90 projects between the shaft 70a and lies in the same radial plane as the pulley 14.

Further, the rearward end of the projecting portion 90 of the jackshaft housing is sealed to maintain lubrication and provide protection for the bearings 77, 76 from dust and the like. This sealing is provided by a suitable cover 171 which is sealingly engaged in an opening in a portion 170 of the jackshaft housing 75. In addition, at the forward end of the portion 90 of the jackshaft housing 75, a suitable seal 173 is located to maintain lubrication around the bearings 77, 76 and protect the bearings 77, 76 from dust and the like. Further, interposed between the bearings 77, 76 is a press-out sleeve 175. The press-out sleeve 175 is slipped into the internal diameter of the shoulder 78 and it has a projecting central portion, designated 180. The press-out sleeve is for purposes of being engaged by a suitable tool to assist in forcing the bearings from the bore in which they are located.

Further, the forwardmost end of the bearing 60 is protected from dirt, etc., by a suitable snap-type cover member 99 which is frictionally engaged in the space or opening defined by the portion 47 of the member 15 at the outboard end thereof.

As noted above, the output member 12 is supported at its forward end for rotation relative to the input member 11 by bearing 60. The output member 112 is also supported at its rear end for rotation relative to the input member by a single bearing 100. The bearing 100 is supported between the input drive member 13 and an axially extending flange portion 101 of the member 16.

The portion 101 is provided with a shoulder 102 which prevents the bearing 100 from moving toward the right, and the bearing 101 is located in axially abutting engagement with the hub 11a of the input member 11 to prevent the bearing from moving toward the left, as shown in FIG. 1. It should be clear that the bearing 100 is located generally in the same radial plane as the land and groove areas 20, 21 of the input coupling member.

The input member 11 is prevented from moving toward the left as viewed in FIG. 1 by a nut 98 which is threaded onto a threaded outer peripheral portion of the shaft 13. The nut 98 engages the left axial end of the hub 11a of the input member.

For purposes of providing effective seals in order to seal the various chambers and particularly the chamber 17 in which the input coupling member 11 is located, seals are provided between the input and output coupling members. These seals are located on opposite axial sides of the input coupling member 11 and are designated 120, 121. The seal 120 comprises a suitable ring seal which is located at the outermost end of the flange 101 between a shoulder or bent-over portion 102a thereof, and the outer race of the bearing 100. The seal includes a housing 103 which encloses a Teflon strip 105. The Teflon strip 105 sealingly engages the outer periphery of the hub 11a and has a bias so as to ride in engagement with the hub 11a. The Teflon strip provides an effective seal between the hub 11a and output member 16.

The seal 121 is located in a recess in the output member 15 defined by a surface 130 of the output member 15. The seal 121 includes a garter spring 131 which biases a sealing member 132 radially inwardly into engagement with the outer periphery of the hub of the input member 11. The garter spring 131 upon high speeds of centrifugal rotation of the input member 11 will relax its bias on the sealing member 132 and as a result the pressure of the member 132 in engagement with the hub 11a of the input member 11 will lessen and in some cases the member 132 could separate from the hub 11a. This is an advantage due to the fact that relative rotation between the surface of the seal member 132 and the surface of the input member 11 causes wear on the seal member 132, and as a result of the fact that the face of this engagement lessens at high speeds wear of the member 132 will substantially lessen. Of course, the fact that the sealing force may lessen and the member 132 may move out of engagement with the hub 11a does not enable leakage to occur because at high centrifugal speeds the viscous shear fluid is thrown radially out into circumferentially extending land and grooves 20, 21.

As noted above, the fluid coupling 10 is primarily for use in driving fan blades of an engine of a vehicle such as a truck. The fan blades are mounted on the output coupling member 12 and accordingly the output coupling member is provided with a plurality of circumferentially spaced fan blade mounting pads, designated 150, against which the fan blades are clamped by suitable fasteners 151. The fasteners 151 comprise bolts which extend through the output coupling member at the outer periphery thereof, as well as through the mounting pad 150, and cooperate with a nut to secure the fan blades on the pad 150. The pads 150 at their inner periphery include a ledge 152 against which the inner edge of the fan blade is supported.

As shown in FIG. 1 the pads 150 are located axially intermediate the reservoir chamber 45 and the lands and grooves 20, 21. The pads 150 are also located substantially intermediate the bearings 60 and 100. Thus the fan blades sweep an area or volume located axially forward of the land and grooves 20, 21 and radially inwardly of the reservoir chamber.

Moreover, as a result of this construction, the output member 15 defines a generally arcuate circumferentially extending chamber, designated 160 in FIG. 1, and which is interrupted by areas of the member in which passage 42 are located.

The chamber 160 opens toward the ram air stream and the ram air flows directly thereinto for cooling purposes. The action of the fan blades pulls that air radially outwardly. Further, the chamber 160 is in part defined by the fan blade mounting pads and is located radially inwardly thereof and axially adjacent the lands and grooves 20, 21.

In the chamber 160 are a plurality of fins, one of which is shown in FIG. 1 and which is designated 160a. These fins provide for effective dissipation of heat which is generated by the transmission of torque between the input and output members in the shear area. Likewise the flow of ram air into the chamber 160 is directed over the reservoir chamber 45 and also directed over the housing of the temperature-responsive device 50 provided for some cooling thereof.

Moreover, for purposes of heat dissipation, the member 16 is also provided with fins 16a which are immediately adjacent the land and groove area 20. The flow of air across these fins adds to the effective cooling of the viscous coupling.

Housing 51a of temperature responsive valve device 50 has a radial flange portion 162 and heat transfer fins 164. Housing 51a is seated on a thermal insulating annular ring 166 and is secured to portion 46 by screws 168 which are thermally insulated from flange portion 162 by collars 170. A pair of annular seals 172 prevent fluid leakage from reservoir 45. Valve device 50 also includes, along with wax filled power element 54, a thermal insulating piston 174, and a helical spring 176 for biasing piston 174 toward element 54. Piston 174 has a cup shaped portion 178 which embraces one end of element 54, a shaft portion 180 which passes through the inside diameter of annular ring 166, and a forked end which receives valving member 51. A pin 182 slidably secures piston 174 to valving member 51. The annular space defined by the outside diameter of shaft portion 180 and the inside diameter of ring 166 allows enough fluid circulation between reservoir 45 and the interior of housing 51a to prevent a hydraulic lock when piston 174 moves. Housing 51a and element 54 are thermally insulated from metal contact with the coupling housing so that element 54 may respond to ambient temperatures exterior to the coupling. The thermal insulating is not defeated by the silicon in the coupling since this fluid is relatively stagnant and has a low heat transfer coefficient. The ability of the element to respond to the ambient temperature exterior of the coupling is further enhanced by placing the temperature control radially outwardly of the rotational axis of the coupling and into a position allowing greater ambient air flow over the element.

Wax filled power elements are well known in the art of thermostatic valves for engine cooling systems. Element 54 is pressed into housing 51a to maximize heat transfer from the housing to the wax in the element. Element 54 includes a push rod 184 which extends from element 54 into contact with piston 174. The wax in the element is selected to have a high coefficient of expansion at its liquid-solid phase change temperature. The wax volume increases when it liquifies and moves the push rod outward from the element thereby moving piston 174 and causing valving members 51 to pivotally move away from arcuate passage 52. The wax volume decreases when it solidifies and spring 176 moves the piston toward the element thereby retracting the push rod and also causing the valving member 51 to pivotally move over arcuate passage 52. The wax in element 54 may have any liquid-solid temperature range desired.

Having described out invention, we claim:

1. A fluid coupling for driving a cooling fan device associated with a vehicle and which is positionable so that ram air impinges directly thereon, said fluid coupling comprising relatively rotatable input and output coupling members, said output coupling member defining a chamber within which said input coupling member rotates, said input and output coupling members having a shear space therebetween and are cooperable with viscous shear fluid in the shear space to transmit torque therebetween, said output member having means defining a reservoir chamber located forwardly of said shear space, means for directing viscous fluid from said shear space into said reservoir chamber including surface portions on one of said members against which said viscous fluid impinges due to rotation of said input member relative to said output member, temperature-responsive valve means for controlling flow of viscous fluid from said reservoir chamber into said shear space and including a temperature-sensing device located forwardly on said output member in the ram air stream, said output member having fan blade mounting pads against which the fan blades are secured, said fan blade mounting pads being located axially between said shear space and said reservoir chamber and being at least in part located radially outwardly of said shear space, a chamber defined by said output member and said fan blade mounting pads and opening into said ram air stream, said chamber being located axially adjacent said shear space and radially inwardly of said mounting pads.

2. A fluid coupling as defined in claim 1 wherein said input coupling member is driven by an input shaft and said output coupling member is supported for rotation relative to said input coupling member by a pair of bearings, one of said bearings being located between a portion of said output member defining said reservoir chamber and said input shaft.

3. A fluid coupling as defined in claim 2 wherein the other of said bearings is located between a flange portion of said output member which projects into a recess in said input member and generally lies in a radial plane containing said shear space.

4. A fluid coupling as defined in claim 1 wherein said input coupling member is driven by an input first shaft, and further including a second shaft drivingly connected with said first shaft, a housing member into which said second shaft extends, a first pair of spaced bearings supporting said output member for rotation relative to said input member, and a second pair of spaced bearings supporting said second shaft for rotation relative to said housing member.

5. A fluid coupling as defined in claim 1 further including an input shaft drivingly connected with said input member, bearing means supporting said output member for rotation relative to said input shaft, said input shaft having a threaded portion and a bolt threaded onto said threaded portion and holding said input member on said input shaft against axial movement in at least one direction.

6. A fluid coupling as defined in claim 1 wherein said means for directing fluid from said shear space into said reservoir chamber comprises a ramp member secured to said output member and a wiper member cooperating with said ramp member and which engages a radially extending surface of said input member.

7. A fluid coupling as defined in claim 1 wherein fluid seal means is provided between input and output members, said fluid seal means comprising at least one seal biased into engagement with said input member and where the force of engagement with the input member lessens in response to centrifugal force.

8. A fluid coupling for driving a cooling fan device associated with a vehicle and which is positionable so that ram air impinges directly thereon, said fluid coupling comprising relatively rotatable input and output coupling members, said input coupling member including an input shaft, said output coupling member defining a chamber within which said input coupling member rotates, said input and output coupling members defining a shear space therebetween and are cooperable with viscous shear fluid in the shear space to transmit torque therebetween, said output member having means defining a reservoir chamber located forwardly of said shear space, means for directing viscous fluid from the shear space into the reservoir chamber and temperature-responsive valve means for controlling flow of viscous fluid from the reservoir chamber into said shear space, said means for directing fluid from said shear space comprising a pumping element and passage means for directing fluid into said reservoir chamber, a pair of bearings supporting said output coupling member for rotation relative to said input coupling member, one of said bearings being located between a portion of said output member defining said reservoir chamber and said input shaft, and the other of said bearings being located between a flange portion of said output member which projects into a recess in said input member and generally lies in a radial place containing said shear space and said input shaft.

9. A fluid coupling for driving a cooling fan device associated with a vehicle and which is positionable so that ram air impinges directly thereon, said fluid coupling comprising relatively rotatable input and output coupling members, said output coupling member defining a working chamber within which said input coupling member roatates, said input and output coupling members defining a shear space therebetween and are cooperable with viscous shear fluid in the shear space to transmit torque therebetween, said output coupling member having means defining a reservoir chamber located forwardly of said shear space, means for directing viscous fluid from the shear space into the reservoir chamber and valve means for controlling flow of viscous fluid from the reservoir chamber into the shear space, and fluid seals located between said input coupling member and said output coupling member providing for sealing of said working chamber in which said input coupling member is rotatable, said fluid seals including at least one seal cooperatively engaged between the input member and the output member and which includes a sealing member in engagement with one of said members said input coupling member has a hub portion which extends axially outwardly in opposite directions from a disc portion thereof, said one of said seals being located between one part of said hub on one side of said disc portion and a first portion of said output member adjacent said reservoir chamber and said fluid seals including a second seal between a second part of said hub on a second side of said disc portion and a second portion of said output member, said second portion of said output member comprises a projecting flange portion which at least in part underlies said shear space.

10. A fluid coupling as defined in claim 9 further including an input shaft drivingly connected with said hub portion of said input member and bearing means supporting said output member for rotation relative to said input shaft, said bearing means including a bearing interposed between said projecting flange portion and said input shaft.

11. A fluid coupling for driving a cooling fan device associated with a vehicle and which is positionable so that ram air impinges directly thereon, said fluid coupling comprising relatively rotatable input and output coupling members, said output coupling member defining a chamber within which said input coupling member rotates, said input and output coupling members having a shear space therebetween and are cooperable with viscous shear fluid in the shear space to transmit torque therebetween, said output member having means defining a reservoid chamber located forwardly of said shear space, said output member having fan blade mounting pads against which the fan blades are secured, said fan blade mounting pads being located axially between said shear space and said reservoir chamber and being at least in part located radially outwardly of said shear space, a chamber defined by said output member and said fan blade mounting pads and opening into said ram air stream, said chamber being located axially adjacent said shear space and radially inwardly of said mounting pads.

12. A fluid coupling comprising relatively rotatable input and output coupling members, said output coupling member defining a chamber within which said input coupling member rotates, said input and output coupling members defining a shear space therebetween and are cooperable with viscous shear fluid in the shear space to transmit torque therebetween, a pair of antifriction bearings supporting said output coupling member for rotation relative to said input coupling member and being located axially on opposite sides of said input member, one of said bearings being located axially relative to said shear space and the other of said bearings being located in a flange portion of said output member which projects into a recess in said input member and generally lies in a radial plane containing said shear space.

13. A fluid coupling as defined in claim 12 wherein said input coupling member has a hub portion which extends axially outwardly in opposite directions from a disc portion thereof, a seal is located between one part of said hub on one side of said disc portion and a first portion of said output member axially inwardly from and adjacent said one bearing and another seal is located between a second part of said hub on a second side of said disc portion and a second portion of said output member axially inwardly from and adjacent said other bearing.

14. A fluid coupling as defined in claim 12 wherein said output member has means defining a reservoir chamber located forwardly of said shear space, and further comprising means for directing viscous fluid from the shear space into the reservoir chamber and temperature responsive valve means for controlling flow of viscous fluid from the reservoir chamber into said shear space, said means for directing fluid from said shear space including a pumping element and passage means formed adjacent the pumping element for directing fluid into said reservoir chamber.

15. A fluid coupling as defined in claim 12 wherein said output member has fan blade mounting pads against which the fan is secured, said fan blade mounting pads being located axially in a generally radially extending plane that passes intermediate the outer extremities of said pair of bearings.

* * * * *